(12) United States Patent
Hu et al.

(10) Patent No.: US 10,776,358 B2
(45) Date of Patent: Sep. 15, 2020

(54) USING A UNIQUE INDEX TO REMOVE GROUP BY BASED ON SET ANALYSIS

(71) Applicant: INTERNATIONAL BUSINESS MACHINES CORPORATION, Armonk, NY (US)

(72) Inventors: Ze Yuan Hu, Beijing (CN); Bing Qing Sun, Beijing (CN); Hang Xiao, Beijing (CN); Xin Ying Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 266 days.

(21) Appl. No.: 15/711,494

(22) Filed: Sep. 21, 2017

(65) Prior Publication Data

US 2019/0087461 A1 Mar. 21, 2019

(51) Int. Cl.
*G06F 16/00* (2019.01)
*G06F 16/2453* (2019.01)
*G06F 16/22* (2019.01)

(52) U.S. Cl.
CPC ...... *G06F 16/24549* (2019.01); *G06F 16/221* (2019.01); *G06F 16/24537* (2019.01)

(58) Field of Classification Search
None
See application file for complete search history.

(56) References Cited

U.S. PATENT DOCUMENTS

| | | | |
|---|---|---|---|
| 5,963,936 A * | 10/1999 | Cochrane | G06F 16/24537 |
| 6,574,623 B1 * | 6/2003 | Leung | G06F 16/24537 |
| 6,775,681 B1 * | 8/2004 | Ballamkonda | G06F 16/24537 |
| | | | 707/718 |
| 6,983,275 B2 | 1/2006 | Koo et al. | |
| 7,062,481 B2 * | 6/2006 | Pham | G06F 16/24537 |
| 7,512,600 B2 * | 3/2009 | Al-Omari | G06F 16/24544 |
| 7,945,562 B2 | 5/2011 | Ahmed et al. | |
| 8,645,313 B1 | 2/2014 | Li et al. | |
| 8,812,491 B2 | 8/2014 | Singh et al. | |
| 9,721,009 B2 * | 8/2017 | Trivedi | G06F 16/60 |
| 10,133,776 B2 * | 11/2018 | Ahmed | G06F 16/24535 |
| 2004/0002956 A1 * | 1/2004 | Chaudhuri | G06F 16/2462 |

OTHER PUBLICATIONS

SQL Server Pro "Indexing for Sort Performance" http://sqlmag.com/print/database-performace-tuning/indexing-sort-perfomance; retrieved from Internet Sep. 21, 2017; 4 pgs.

\* cited by examiner

*Primary Examiner* — Debbie M Le
(74) *Attorney, Agent, or Firm* — Cantor Colburn LLP; Richard Wilhelm

(57) ABSTRACT

A technique relates to determining when to skip a group by clause in a query. A computer checks that a condition is satisfied for a table. The condition is selected from the group consisting of having a unique index on one or more columns of the table or having a function on the one or more columns that makes rows in the GROUP BY clause unique. The group by clause is part of the query on the table. In response to the condition being satisfied, the group by clause associated with the one or more columns is skipped. In response to the condition not being satisfied, the group by clause associated with the one or more columns is executed.

20 Claims, 12 Drawing Sheets

TABLE 206

| ID | SUBJECT | SEMESTER | ATTENDEE |
|----|---------|----------|----------|
| 01 | ITB001 | 1 | John |
| 02 | ITB001 | 1 | Erica |
| 03 | ITB001 | 1 | Mickey |
| 04 | ITB001 | 1 | Jenny |
| 05 | ITB001 | 1 | James |
| 05 | MKB114 | 1 | Jamie |
| 07 | MKB114 | 1 | Erica |

| ID | ATTENDEE |
|----|----------|
| 1  | John     |
| 2  | Erica    |
| 3  | Mickey   |
| 4  | Jenny    |
| 5  | James    |
| 5  | Jamie    |
| 7  | Erica    |

QUERY
SELECT id, Attendee
FROM p1.subject_selection
WHERE semester=1
GROUP BY id, Attendee

| ID | 2 |
|---|---|
| 1 | John1 |
| 2 | Erica1 |
| 3 | Mickey1 |
| 4 | Jenny1 |
| 5 | James1 |
| 5 | Jamie1 |
| 7 | Erica1 |

QUERY
SELECT id, CONCAT(Attendee, Semester) FROM p1.subject_selection
WHERE semester=1
GROUP BY id, CONCAT(Attendee, Semester)

| ID | 2 |
|---|---|
| 1 | John1 |
| 2 | Erica1 |
| 3 | Mickey1 |
| 4 | Jenny1 |
| 5 | James1 |
| 5 | Jamie1 |
| 7 | Erica1 |

QUERY
SELECT id, CONCAT(Attendee, Semester) FROM p1.subject_selection WHERE semester=1

```
Access Plan:
------------------------
  Total Cost:    9.61174
  Query Degree:        1

Rows
     RETURN
      ( 1 )
      Cost
       I/O
        |
       0.28
     TBSCAN
      ( 2 )
     9.58896
        1
        |
        7
    TABLE: P1
 SUBJECT_SELECTION
        Q1
```

| ID | 2 |
|---|---|
| 2. | E |
| 7. | E |
| 1. | J |
| 4. | J |
| 5. | J |
| 3. | M |

QUERY

SELECT id, SUBSTR(Attendee, 1, 1) FROM p1.subject_selection
WHERE semester=1
GROUP BY id, SUBSTR(Attendee, 1, 1)

QUERY
SELECT id, SUBSTR(Attendee, 1, 1) FROM p1.subject_selection
WHERE semester=1

USING A UNIQUE INDEX TO REMOVE GROUP BY BASED ON SET ANALYSIS

BACKGROUND

The present invention generally relates to relational databases in computer systems, and more specifically, to using a unique index and/or monotone function to remove group by based on set analysis.

Query language (QL) refers to any computer programming language that requests and retrieves data from database and information systems by sending queries. It works on user entered structured and formal programming command based queries to find and extract data from host databases. Query language may also be termed database query language. SQL is an example of a standard query language for accessing and manipulating databases, and SQL stands for Structured Query Language. SQL can execute queries against a database, retrieve data from a database, insert records in a database, update records in a database, delete records from a database, create new databases, create new tables in a database, etc. In SQL, the GROUP BY statement is often used with aggregate functions (COUNT, MAX, MIN, SUM, AVG) to group the result-set by one or more columns. The SQL GROUP BY clause is used in collaboration with the SELECT statement to arrange identical data into groups. This GROUP BY clause follows the WHERE clause in a SELECT statement and precedes the ORDER BY clause.

Indexes are special lookup tables that the database search engine can use to speed up data retrieval. Simply put, an index is a pointer to data in a table. An index in a database is very similar to an index in the back of a book. Indexes can also be unique, like the UNIQUE constraint, in that the index prevents duplicate entries in the column or combination of columns on which there is an index.

The monotone function is a function which has a UNIQUE output value for each UNIQUE input value. Some databases have built in scalar functions and user defined functions (UDF) that are a monotone function. The monotonicity of a function is determined by the function's instinct (or inherent) property itself.

SUMMARY

Embodiments of the present invention are directed to a computer-implemented method for determining when to skip a group by clause in a query. A non-limiting example of the computer-implemented method includes checking, by a computer, that a condition is satisfied for a table, where the condition is selected from the group consisting of having a unique index on one or more columns of the table or having a function on the one or more columns that makes rows in the GROUP BY clause unique. The group by clause is part of the query on the table. The method includes in response to the condition being satisfied, skipping the group by clause associated with the one or more columns, and in response to the condition not being satisfied, executing the group by clause associated with the one or more columns.

Embodiments of the present invention are directed to a system for determining when to skip a group by clause in a query. A non-limiting example of the system includes a processing circuit and a storage medium readable by the processing circuit and storing instructions that, when executed by the processing circuit, cause the processing circuit to perform a method including checking, by the processing circuit, that a condition is satisfied for a table, where the condition is selected from the group consisting of having a unique index on one or more columns of the table or having a function on the one or more columns that makes rows in the GROUP BY clause unique. The group by clause is part of the query on the table. The method includes in response to the condition being satisfied, skipping the group by clause associated with the one or more columns, and in response to the condition not being satisfied, executing the group by clause associated with the one or more columns.

Embodiments of the invention are directed to a computer program product for determining when to skip a group by clause in a query, the computer program product comprising a computer readable storage medium having program instructions embodied therewith, where the computer readable storage medium is not a transitory signal per se. The program instructions are readable by a computer to cause the computer to perform a method. A non-limiting example of the method includes checking, by the computer, that a condition is satisfied for a table, where the condition is selected from the group consisting of having a unique index on one or more columns of the table or having a function on the one or more columns that makes rows in the GROUP BY clause unique. The group by clause is part of the query on the table. The method includes in response to the condition being satisfied, skipping the group by clause associated with the one or more columns, and in response to the condition not being satisfied, executing the group by clause associated with the one or more columns.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts the results of a query according to embodiments of the present invention;

FIG. 5 depicts results of a query according to embodiments of the present invention;

FIG. 7 depicts results of a query after eliminating a group by clause according to embodiments of the present invention;

FIG. 8 depicts an access path/plan for executing the query without the group by clause in FIG. 7 according to embodiments of the present invention;

FIG. 11 depicts the results of a query according to embodiments of the present invention; and FIG. 12 depicts the results of a query according to embodiments of the present invention.

Figure 1:
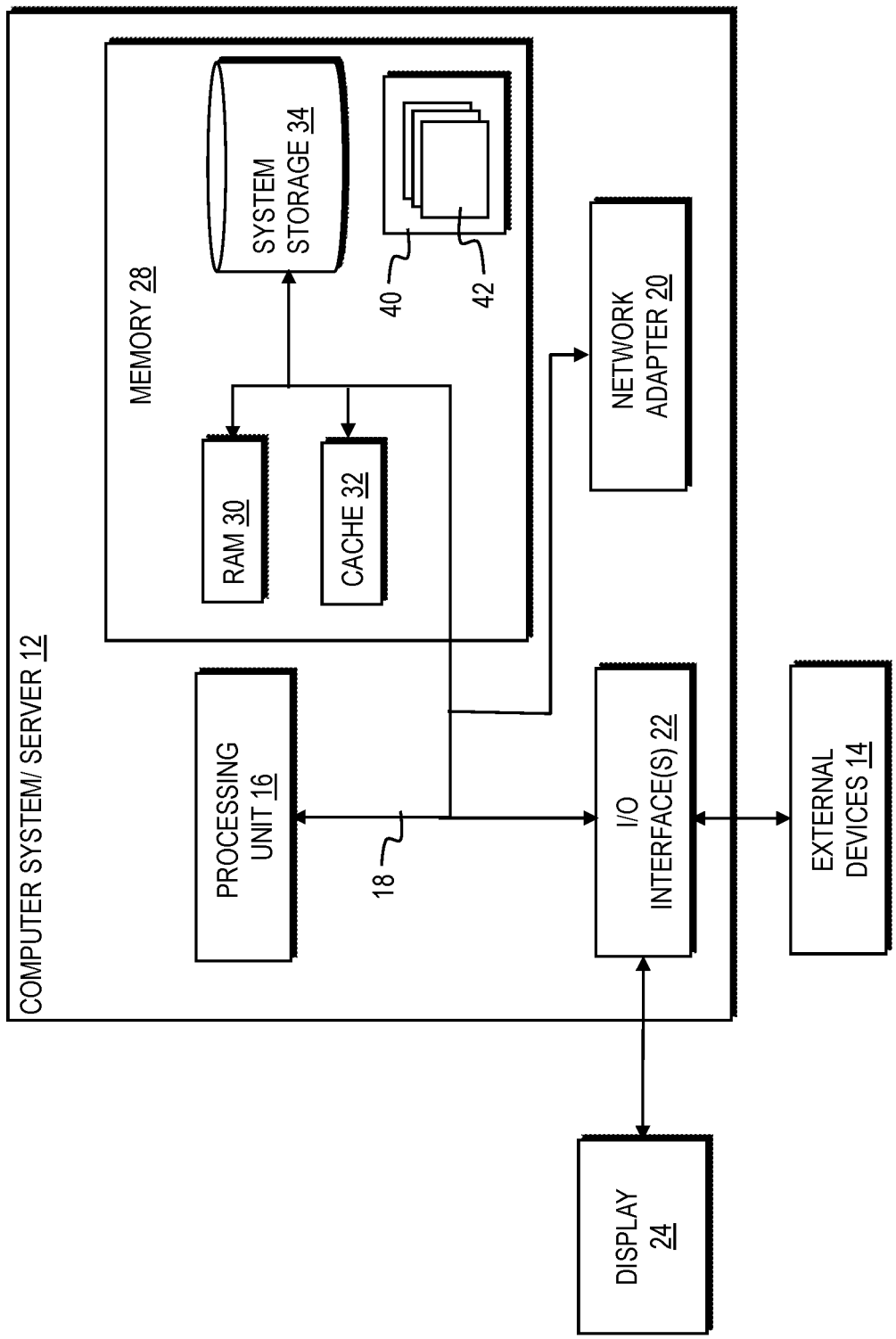
FIG. 1 depicts a schematic of an example computing node according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, for a typical GROUP BY clause, the GROUP BY clause first needs to SORT all the data inside the GROUP BY clause, and then categorize the same values into the same group. This operation can utilize (hog) a huge amount of resources, which can lead to an "ABEND" if the data size for columns inside the GROUP BY clause is huge (i.e., an ABEND occurs after a predefined amount of time, resources, processing cycles, etc.). This is mainly because the SORT operation can take a relatively long time to finish (which may be more than the predefined amount of time, resources, processing cycles, etc., for the ABEND to occur). An ABEND is an abnormal end or an abnormal termination of software, or a program crash. The ABEND occurs because the computer system has no response after the predefined amount of time, a predefined amount of resources have been utilized, a predefined amount of processing cycles on the processor have occurred, etc.

Turning now to an overview of the aspects of the invention, one or more embodiments of the invention address the above-described shortcomings of the prior art by providing a technique to utilize a unique index to construct a better access path (also referred to as an access plan, access plan, query execution plan, query plan, execution plan, etc.) for a query. A query plan is an ordered set of steps used to access data in a SQL relational database management system (RDMS). Since SQL is declarative, there are typically a large number of alternative ways to execute a given query, with widely varying performance. When a query is submitted to the database, the query optimizer evaluates some of the different, correct possible plans for executing the query and returns what it considers the best option. Because query optimizers are imperfect, database users and administrators sometimes need to manually examine and tune the plans produced by the optimizer to obtain better performance.

The above-described aspects of the invention address the shortcomings of the prior art by providing an optimizer configured to exploit the unique index information to choose the most efficient access path which is the main factor for query performance. The GROUP BY clause can be eliminated provided the existence of a UNIQUE INDEX in accordance with embodiments of the present invention. This situation can be generalized when used with scalar functions. Technical effects and benefits include improvements to the operations and functioning of a computer by reducing the amount of processing (load) performed by processors on the computer and reducing the amount of input/output required by a query. Also, the optimization reduces the amount of instructions required in a query. Particularly, technical effects and benefits of the optimization include better query performance (of the computer) by avoiding SORT during GROUP BY, because by removing GROUP BY the optimizer also removes SORT. Technical effects and benefits of the optimization reduce the complexity of a query (executing on a computer) by pruning GROUP BY operation because the lines of the query related to the GROUP BY operation can be skipped and/or eliminated. Technical effects and benefits of the optimization assist with quality assurance by simplifying the access plan, which can be reviewed for quality assurance.

Turning now to a more detailed description of aspects of the present invention, FIG. 1 depicts a schematic of an example computing node according to embodiments of the present invention. The computing node includes a computer system/server 12, which can be operational with numerous other general purpose or special purpose computing system environments or configurations. The optimization can be included in a server, mainframe, etc., and the computer system/server 12 can be representative of various types of computer systems on which the optimization (and query) can run.

Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media. The system memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. Memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include but are not limited to: microcode, device drivers, redundant processing units, external disk drive arrays, RAID systems, tape drives, and data archival storage systems, etc.

Figure 2:
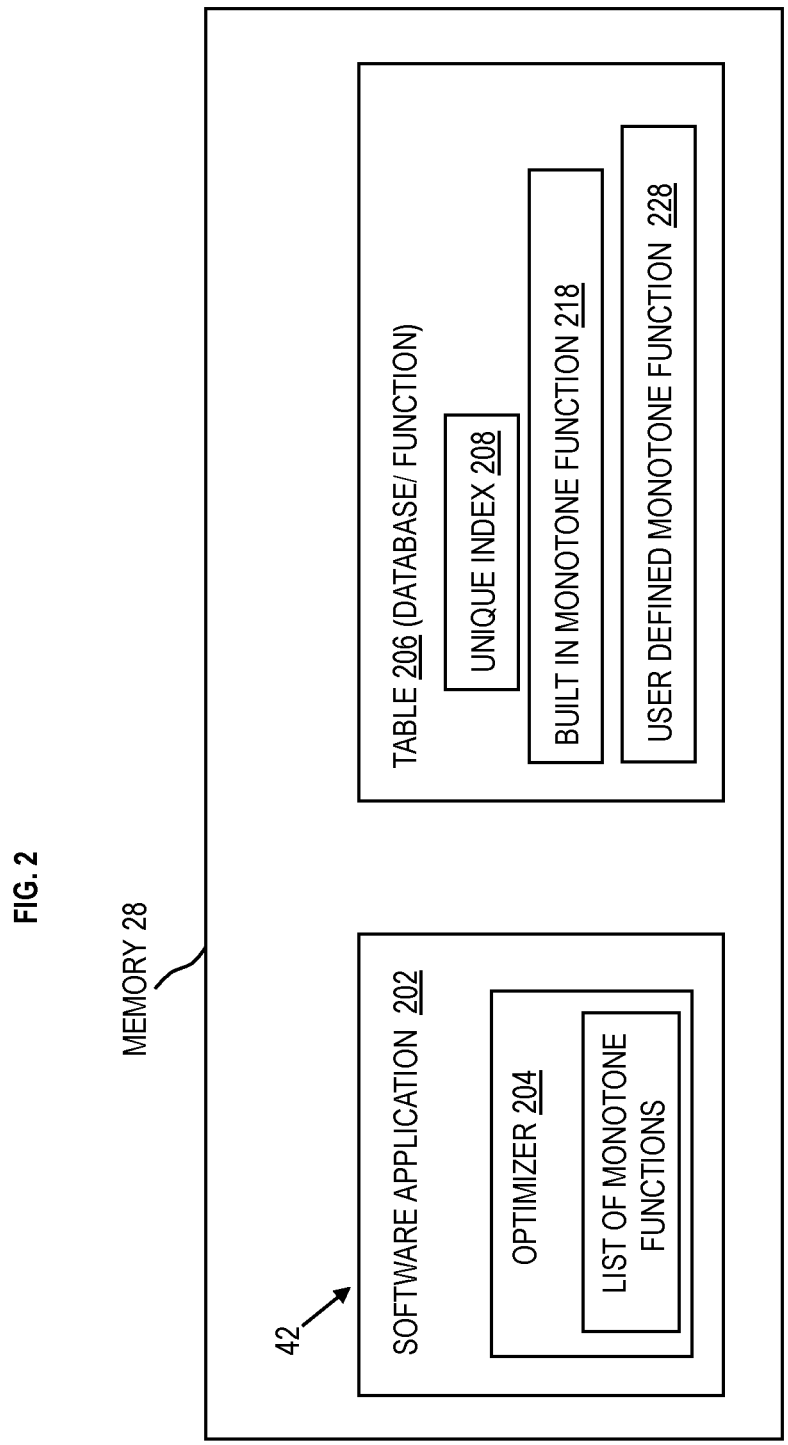
FIG. 2 depicts a simplified view of memory in a computer system/server according to embodiments of the present invention.

FIG. 2 depicts a simplified view of the memory 28 in computer system/server 12 according to embodiments of the present invention. Accordingly, some elements of the memory 28 are not shown so as not to obscure the figure. FIG. 2 shows example program modules 42 which may include a software application 202. The software application 202 is configured to query one or more databases which may be table 206, and the table 206 can include a unique index 208 and/or work in conjunction with the unique index 208. The unique index 208 (including a UNIQUE constraint) is configured to prevent duplicate entries in the column or combination of columns (in table 206) on which there is an index.

For example, the software application 202 may be configured to operate in a query language such as, for example, SQL, etc. The software application 202 includes and/or works in conjunction with an optimizer 204. The optimizer 204 can be integrated with the software application 202 such that operations of the software application 202 can include the functions of the optimizer 204. The query optimizer is built-in database software that determines the most efficient method for a SQL statement to access requested data. The optimizer chooses the access plan/path with the lowest cost among all considered candidate plans. The optimizer uses available statistics to calculate the cost. For a specific query in a given environment, the cost computation accounts for factors of query execution such as I/O, CPU, and communication.

According to embodiments of the present invention, the optimizer 204 is configured to utilize the unique index 208 to construct a better access path (access plan), such that the query is submitted to the database 206, and the query optimizer 204 evaluates the different and correct possible plans for executing the query and returns what it considers the best option. Particularly, the query optimizer 204 is configured to identify (e.g., search for and identify) that there is a unique index 208 for the column or columns in the table 206 to be queried by the software application 202. It is assumed a query is in the process of being executed by the software application 202 to find predefined information in the table 206 and the query has a GROUP BY clause. By using the unique index information in the unique index 208 which identifies the same column/columns to be queried in the table 206, the optimizer 204 is configured to eliminate the GROUP BY clause in the query because of the identification a UNIQUE INDEX (e.g., the unique index 208) on the same column/columns being queried. By removing/eliminating the GROUP BY the optimizer 204 also removes/avoids the SORT clause which occurs during (as part of) the GROUP BY clause.

Similar to the UNIQUE INDEX 208, a built in monotone function 218 is depicted in FIG. 2. Also, the table 206 can have a user defined monotone function 228. The monotone function 218 (including the user defined monotone function 228) is a function that has a UNIQUE output value for each UNIQUE input value. Just as discussed herein for the UNIQUE INDEX 208, the optimizer 204 is configured to utilize the monotone function 218 (which can be, for example, the user defined monotone function 228) to construct a better access path (access plan), such that the query is submitted to the database 206, and the query optimizer 204 evaluates the different and correct possible plans for executing the query and returns what it considers the best option. Particularly, the query optimizer 204 is configured to identify (e.g., search for and identify) that there is a monotone function 218 (and/or user defined monotone function 228) for the column or columns in the table 206 to be queried by the software application 202. It is assumed a query is in the process of being executed by the software application 202 to find predefined information in the table 206 and the query has a GROUP BY clause. By using the monotone function 218 (and/or user defined monotone function 228) which is applied to the same column/columns to be queried in the table 206, the optimizer 204 is configured to eliminate the GROUP BY clause in the query because of the identification a monotone function 218 (and/or user defined monotone function 228) on the same column/columns being queried. By removing/eliminating the GROUP BY the optimizer 204 also removes/avoids the SORT clause which occurs during (as part of) the GROUP BY clause.

Figure 3:
FIG. 3 depicts an example table according to embodiments of the present invention.

FIG. 3 depicts an example table according to embodiments of the present invention. The table 206 can be formed by software in memory 28 (which can be software 202 and/or other program modules 42). The table 206 may have been loaded/stored in memory 28 from another computer system/server. The software application 202 and/or other software in memory 28 can create and store the table 206, along with the UNIQUE INDEX (e.g., unique index 208), and an example algorithm is provided below.

Algorithm:
CREATE TABLE p1.subject_selection (id dec(2,0), subject VARCHAR(30), Semester VARCHAR(30), Attendee VARCHAR(30));
CREATE UNIQUE INDEX p1.idx1 ON p1.subject_selection (id ASC, Attendee ASC);
INSERT INTO p1.subject_selection values.

The table 206 can have an ID column, subject column, semester column, and attendee column. This example table 206 is named p1. For explanation purposes, the table 206 is depicted with 4 columns and 7 rows for simplification, and it should be understood that the table could have more rows and columns than in this simplified example.

FIG. 4 depicts the results of a query on table 206 according to embodiments of the present invention. The query could have been requested by a user of the computer system/server 12, by another computer connected to the computer system/server 12, etc. In an example scenario, the software application 202 executes the example query below: SELECT id, Attendee FROM p1.subject_selection WHERE semester=1 GROUP BY id, Attendee.

The results 402 of the above query are shown in FIG. 4. As can be seen, 7 records are selected for id and attendee in the results 402. The GROUP BY clause was performed in the query as normal.

In the above example, the GROUP BY clause is "GROUP BY id, Attendee". Instead of performing the GROUP BY clause of the query, the optimizer 204 is configured to remove (e.g., skip and/or not execute) the GROUP BY clause when the optimizer finds that the unique index applies to the column or columns upon which the GROUP BY clause is to be performed. For example, the optimizer 204 of the software application 202 is configured to scan/parse the query in order to identify the GROUP BY clause/operation, and the optimizer 204 is configured to find the column or columns associated with the GROUP BY clause which are the id column and Attendee column (of table 206). The optimizer 204 is configured to search for a unique index for the identified columns in the GROUP BY clause (which are id and Attendee columns) in table 206, and the optimizer finds the unique index 208 for the identified columns. Because the software application 202 (and/or other program modules 42) previously performed create unique index on (id, Attendee), which is a qualified grouping set, the optimizer 204 can safely remove the GROUP BY clause (which is "GROUP BY id, Attendee" in this scenario. Using the optimizer 204, the software application 202 is configured to provide the same results 402 (as obtained with execution of the GROUP BY clause) even without executing the GROUP BY clause in the query.

As another example, FIG. 5 depicts the results 502 of a query according to embodiments of the present invention. This query includes a GROUP BY clause and can be executed by the software application 202 in order to retrieve data from the table 206. The query is below.

SELECT id, CONCAT(Attendee, Semester) FROM p1.subject_selection WHERE semester=1 GROUP BY id, CONCAT(Attendee, Semester).

Figure 6:
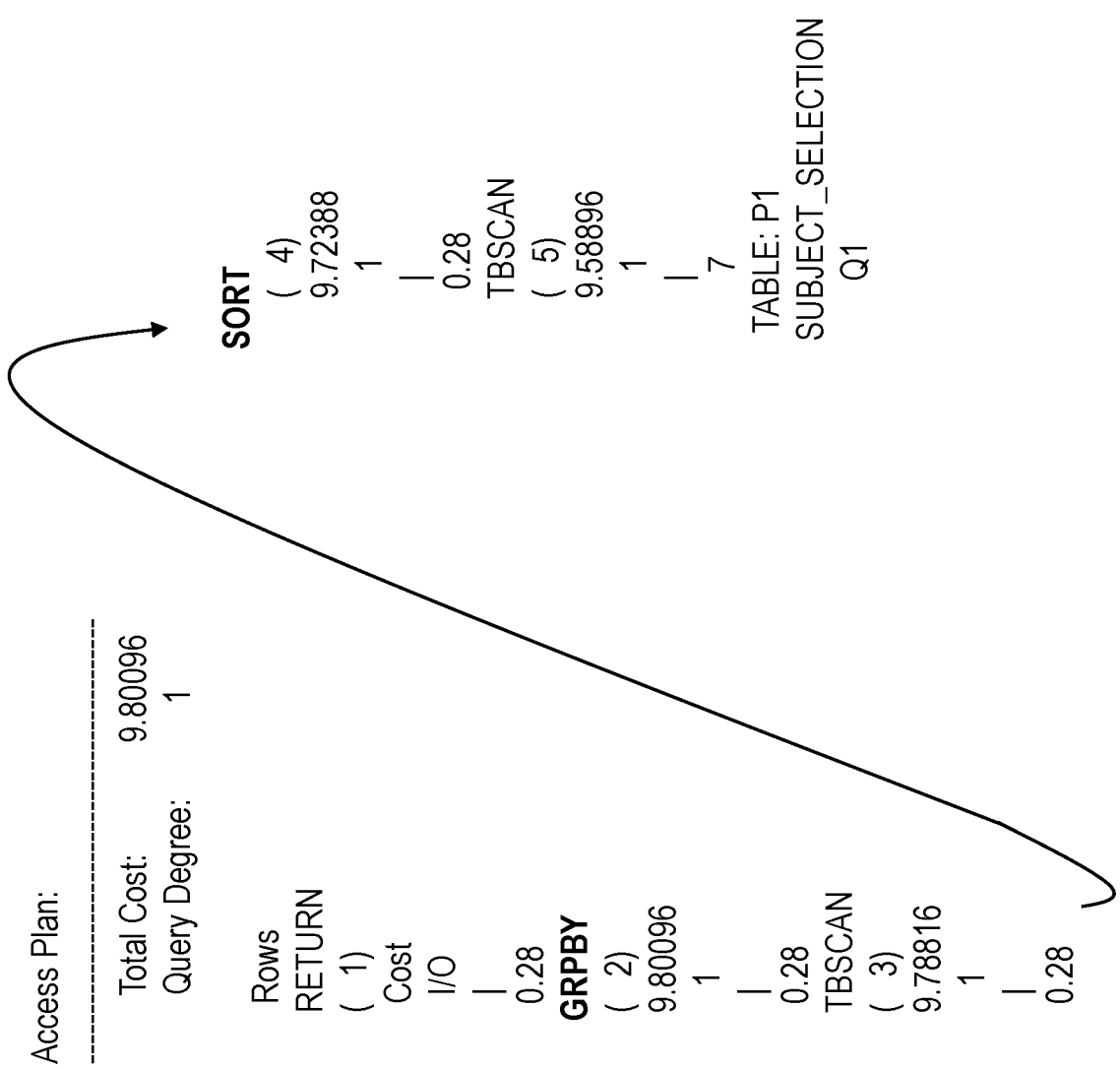
FIG. 6 depicts an access path/plan for executing the query in FIG. 5 according to embodiments of the present invention.

In this example, executing the query results in access path/plan 602 depicted in FIG. 6. The GROUP BY clause is "GROUP BY id, CONCAT(Attendee, Semester)". To execute the query and obtain the results 502 in FIG. 5, the software application 202 performs the access path/plan 602. As can be seen, the access path/plan 602 is an ordered set of steps used to access data in table 206 to thereby fulfill the query. The GROUP BY clause requires a SORT clause. The total cost of the query is 9.80096. The cost of the query refers to statement execution cost, which is how long it will take to run the statement. The cost can be measured in cost units that are arbitrary, but conventionally mean disk page fetches. The cost of the query can be measured in milliseconds, cycles on a processor (e.g., cycles on the processor unit), and/or input/output accesses. Analogously, this same benefit occurs when the monotone function 218 is found in the query just as when the UNIQUE INDEX 208 is found. Further examples regarding the monotone function or not having the monotone function are discussed later below.

To show a reduction in the cost (time, processing requirements, input/output accesses, etc.) of the query, FIG. 7 depicts the results 702 of the query after eliminating the GROUP BY clause according to embodiments of the present invention. Not only is the GROUP BY clause eliminated from the query but the required SORT command is eliminated from the access path/plan in FIG. 8. Instead of executing the query of FIG. 5 [SELECT id, CONCAT (Attendee, Semester) FROM p1.subject_selection WHERE semester=1 GROUP BY id, CONCAT(Attendee, Semester)], the optimizer 204 of the software application 202 is configured to eliminate the GROUP BY clause in the query such that the software application 202 retrieves data from the table 206 by executing the modified query below:

SELECT id, CONCAT(Attendee, Semester) FROM p1.subject_selection WHERE semester=1.

In this example, executing the above (modified) query executes the access path/plan 802 depicted in FIG. 8. To execute the query and obtain the results 702 in FIG. 7 which are the same as the results 502 in FIG. 5, the software application 202 performs the access path/plan 802.

As can be seen in the access path/plan 802, the software application 202 does not execute the GROUP BY and the SORT commands. As such, the query cost of the query in FIGS. 7 and 8 is 9.61174 which is lower than the query cost in FIGS. 5 and 6. Therefore, the optimizer 204 is configured to skip execution of the GROUP BY command and the SORT command. However, the results 502 and 702 in FIGS. 5 and 7 are the same even though the optimizer modified the query for FIGS. 7 and 8. As noted above, the GROUP BY command (typically) includes execution of a SORT command to perform the query even though the SORT command would not be seen in the query itself. The required SORT command is not observed until the access plan 602 was viewed.

To remove the GROUP BY clause of the query in FIGS. 5 and 6, the optimizer is configured to remove (e.g., skip and/or not execute) the GROUP BY clause when the optimizer finds that the unique index applies to the column or columns upon which the GROUP BY clause is to be performed (for FIGS. 5 and 6). For example, the optimizer 204 of the software application 202 is configured to scan/parse the query in order to identify the GROUP BY clause/operation, and the optimizer 204 is configured to find the column or columns associated with the GROUP BY clause which are the id column, Attendee column, and Semester column of table 206. The optimizer 204 is configured to search for a unique index having the (matching) identified columns (which are id, Attendee, and Semester columns) in table 206, and the optimizer 204 finds the unique index 208 for the identified columns. Because the software application 202 (and/or other program modules 42) previously performed create unique index on (id, Attendee, Semester), which is a qualified grouping set, the optimizer 204 can safely remove the GROUP BY clause (which is "GROUP BY id, CONCAT(Attendee, Semester)" in this scenario. Using the optimizer 204, the software application 202 is configured to provide the results 702 even without executing the GROUP BY clause in the query.

It is noted that in the query illustrating the CONCAT example, the CONCAT example was described with the UNIQUE INDEX 208. The CONCAT is one example of why a monotone function can work just like the UNIQUE INDEX, as utilized by the optimizer 204. In contrast, an example using a non-monotone function (with a SUBSTR scalar function) will be discussed. This example shows when the scalar function does not satisfy the monotone property, and the optimizer 204 cannot eliminate the GROUP BY clause. However, when the scalar function satisfies the monotone property (i.e., the scalar function is a monotone function), then the optimizer can eliminate the GROUP BY clause.

It is assumed that there is the following table setup, which is the same as the table 206 discussed above but in this example the UNIQUE INDEX is created.

CREATE TABLE p1.subject_selection (id dec(2,0), subject VARCHAR(30), Semester VARCHAR(30), Attendee VARCHAR(30));

INSERT INTO p1.subject_selection values.

Accordingly, the table 206 is provided. As discussed above, the table 206 can have an ID column, subject column, semester column, and attendee column.

FIG. 11 depicts the results of a query on table 206 according to embodiments of the present invention. Now, it is assumed that there is the following statement (query):

SELECT id, SUBSTR(Attendee, 1, 1) FROM p1.subject_selection WHERE semester=1 GROUP BY id, SUBSTR(Attendee, 1, 1).

The query outputs the results 1102 depicted in FIG. 11. There are 6 records selected from the above query. To further illustrate monotone function utilization by the optimizer 205, this example is illustrative of when a scalar function or user defined function (UDF) does not satisfy monotone property, and therefore, the optimizer 204 cannot eliminate the GROUP BY clause. As can be seen from the query above, within the GROUP BY clause there is a scalar function called SUBSTR that does not satisfy monotone property. For example, SUBSTR takes three parameters: column_name (i.e., Attendee), start_index (i.e., 1), and end_index (i.e., 1). The SUBSTR function will truncate the values specified in column_name with the start_index and end_index. For example, for row "(01, 'ITB001', 1, 'John')", the value is 'John' and the software application 202 (executing the query) applies SUBSTR on it (i.e., on 'John') with start_index 1 and end_index 1, and software application 202 obtains "J" because the first letter (indicated by start_index 1) is "J" and software application 202 ends with end_index: 1, which is the letter itself. As can be seen, SUBSTR is not monotone because even though the input values are unique, the output values may not be unique. For example, both "John" and "Jenny" give letter "J" when the query applies SUBSTR(Attendee, 1, 1). Therefore, the optimizer 204 searches the query but does not find a monotone function (or a UNIQUE INDEX), and thus the optimizer 204 does not eliminate the GROUP BY clause.

In one implementation, the optimizer 204 can have a list of monotone functions, and/or the optimizer 204 can access the list of monotone functions. The optimizer 204 is configured to compare any scalar function in the query with the monotone functions in the list to determine that the GROUP BY clause can be removed when the function in the query matches one of the monotone functions in the list. Otherwise, the GROUP BY clause is not removed.

However, suppose that the GROUP BY clause were to be removed in the above case. As such, the following example assumes that the GROUP BY clause is removed even though the optimizer 204 did not find a monotone function. FIG. 12 depicts the results 1202 of a query on table 206 when the GROUP BY clause is removed although the scalar function is not a monotone function according to embodiments of the present invention. By removing the GROUP BY clause, the query is (or operates) as follows:

SELECT id, SUBSTR(Attendee, 1, 1) FROM p1.subject_selection WHERE semester=1.

This results in 7 records shown in FIG. 12. As can be seen with GROUP BY clause, there are 6 records selected in the results 1102 of FIG. 11 but if the GROUP BY clause is eliminated when scalar function/UDF is not monotone, then the result is wrong (i.e., in this case, the results 1202 have 7 records selected). FIGS. 11 and 12 are for explanation purposes, and are intended to illustrate a difference in the output when the scalar function is not monotone.

Figure 9:
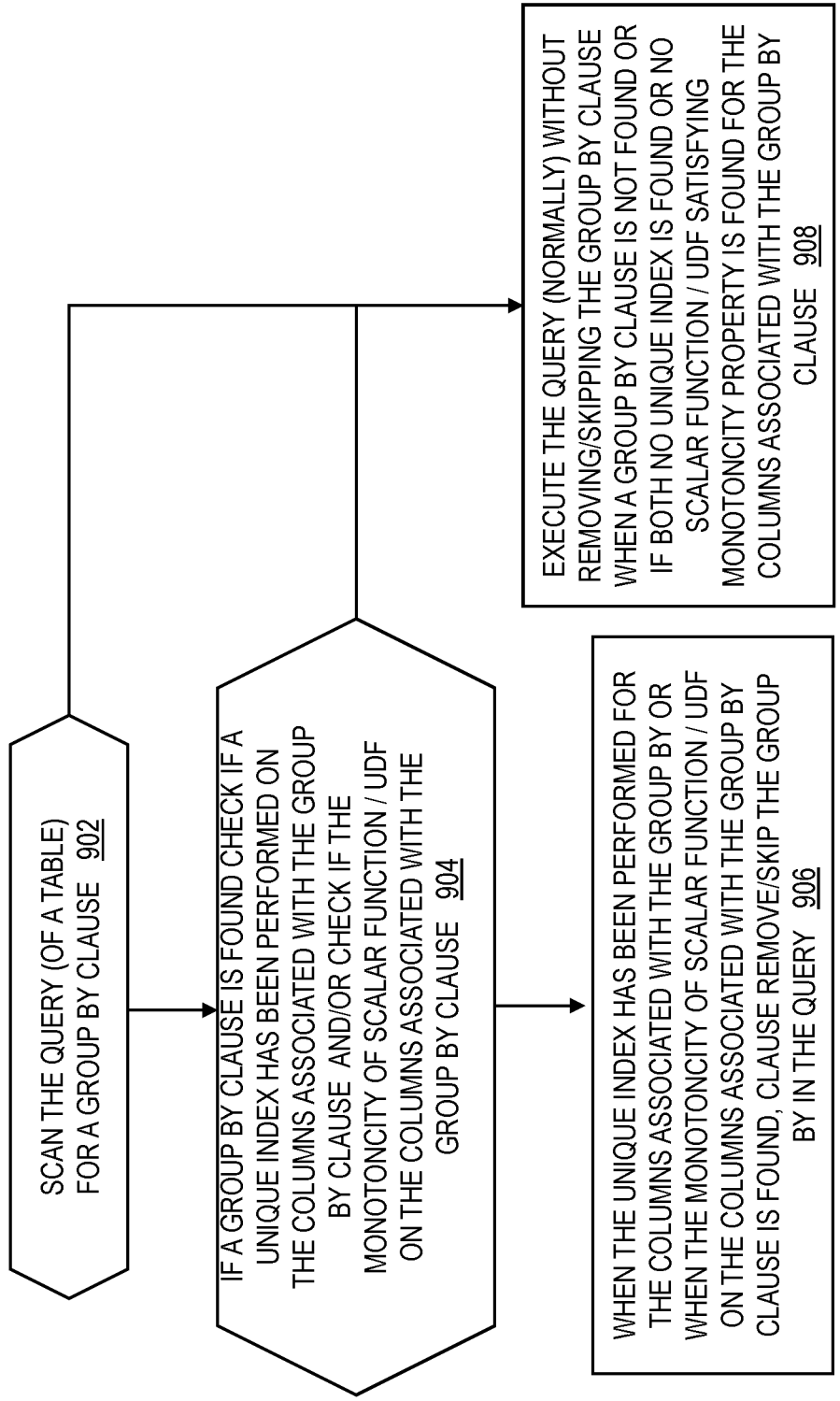
FIG. 9 is a flow chart of removing/skipping a group by clause according to embodiments of the present invention.

FIG. 9 is a flow chart 900 of the optimizer 204 of the software application 202 removing/skipping the GROUP BY clause according to embodiments of the present invention. The optimizer 204 of the software application 202 is configured to scan the query (for a table) for a GROUP BY clause at block 902. The optimizer 204 searches the query to find a match to the GROUP BY syntax.

The optimizer 204 of the software application 202 is configured to, if a GROUP BY clause is found, check if a UNIQUE INDEX has been performed on the columns associated with the GROUP BY clause and/or check the monotonocity of any scalar function/UDF on the columns associated with the GROUP BY clause at block 904.

The optimizer 204 of the software application 202 is configured to, when the UNIQUE INDEX has been (previously) performed for the columns associated with the GROUP BY clause and/or when the monotonocity of the scalar function/UDF on the columns associated with the GROUP BY clause is found, remove/skip the GROUP BY in the query at block 906. By removing/skipping the GROUP BY in the query, the software application 202 does not execute the GROUP BY clause (and the associated SORT).

The software application 202 is configured to execute the query (normally) without removing/skipping the GROUP BY clause when a GROUP BY clause is not found, or both when no UNIQUE INDEX is found for the columns associated with the GROUP BY clause and when no scalar function/UDF satisfies the monotoncity property for the columns associated with the GROUP BY clause at block 908.

Figure 10:
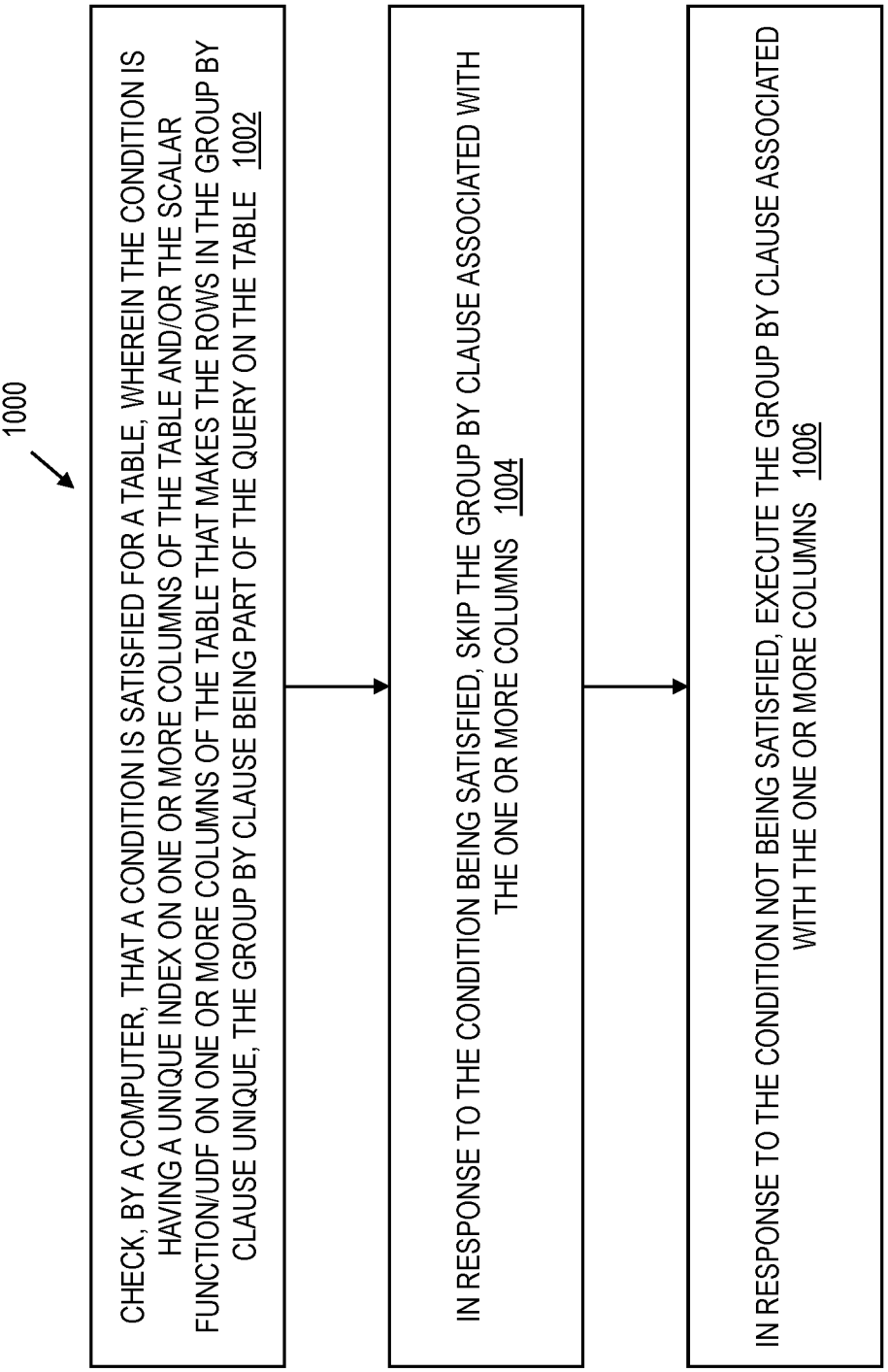
FIG. 10 is a flow chart of a computer-implemented method for determining when to skip (remove) a group by clause in a query according to embodiments of the present invention.

FIG. 10 is a flow chart 1000 of a computer-implemented method for determining when to skip (remove) a group by clause in a query according to embodiments of the present invention. At block 1002, the computer is configured to check that a condition is satisfied for a table (such as, e.g., table 206), where the condition is selected from the group consisting of having a unique index on one or more columns of the table and/or having a function (e.g., scalar function/UDF) on the one or more columns that makes rows in the GROUP BY clause unique, where the group by clause is part of the query on the table.

At block 1004, the computer 12 is configured to, in response to the condition being satisfied, skip the group by clause associated with the one or more columns.

At block 1006, the computer 12 is configured to, in response to the condition not being satisfied, execute the group by clause associated with the one or more columns.

The computer 12 is configured to check that the function has a one input to one output when the function is applied to the one or more columns. The function is a scalar function (such as monotone function 218). The scalar function is an operation to the one or more columns. The function is a user defined monotone function 228.

Checking, by the computer, that the condition is satisfied for the table comprises parsing the query to find the group by clause. Skipping the group by clause associated with the one or more columns comprises executing the query without performing the group by clause. Skipping the group by clause associated with the one or more columns causes a shorter access plan for executing the query compared to executing the query without skipping the group by clause.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for determining when to skip a group by clause in a query, the method comprising:

checking, by a computer, that a condition associated with the query having the group by clause is satisfied in a table, wherein the condition is selected from the group consisting of having a unique index on one or more columns of the table or having a function on the one or more columns that makes rows in the group by clause unique, the group by clause being part of the query on the table;

in response to the condition associated with the query having the group by clause being satisfied, skipping the group by clause associated with the one or more columns; and in response to the condition not being satisfied, executing the group by clause associated with the one or more columns.

2. The computer-implemented method of claim 1, the computer is configured to check that the function has a one input to one output when the function is applied to the one or more columns.

3. The computer-implemented method of claim 1, wherein the function is a scalar function.

4. The computer-implemented method of claim 1, wherein the function is a user defined function.

5. The computer-implemented method of claim 1, wherein checking, by the computer, that the condition is satisfied for the table comprises parsing the query to find the group by clause.

6. The computer-implemented method of claim 1, wherein skipping the group by clause associated with the one or more columns comprises executing the query without performing the group by clause.

7. The computer-implemented method of claim 1, wherein skipping the group by clause associated with the one or more columns causes a shorter access plan for executing the query compared to executing the query without skipping the group by clause.

8. A computer program product for determining when to skip a group by clause in a query, the computer program product comprising a computer readable storage medium having program instructions embodied therewith, wherein the computer readable storage medium is not a transitory signal per se, the program instructions readable by a computer to cause the computer to perform a method comprising:

checking, by the computer, that a condition associated with the query having the group by clause is satisfied in a table, wherein the condition is selected from the group consisting of having a unique index on one or more columns of the table or having a function on the one or more columns that makes rows in the group by clause unique, the group by clause being part of the query on the table;

in response to the condition associated with the query having the group by clause being satisfied, skipping the group by clause associated with the one or more columns; and in response to the condition not being satisfied, executing the group by clause associated with the one or more columns.

9. The computer program product of claim 8, the computer is configured to check that the function has a one input to one output when the function is applied to the one or more columns.

10. The computer program product of claim 8, wherein the function is a scalar function.

11. The computer program product of claim 8, wherein the function is a user defined function.

12. The computer program product of claim 8, wherein checking, by the computer, that the condition is satisfied for the table comprises parsing the query to find the group by clause.

13. The computer program product of claim 8, wherein skipping the group by clause associated with the one or more columns comprises executing the query without performing the group by clause.

14. The computer program product of claim 8, wherein skipping the group by clause associated with the one or more columns causes a shorter access plan for executing the query compared to executing the query without skipping the group by clause.

15. A computer for determining when to skip a group by clause in a query, the computer comprising:

a processing circuit; and a storage medium not being a transitory signal per se, the storage medium being readable by the processing circuit and storing instructions that, when executed by the processing circuit, cause the processing circuit to perform a method comprising:

checking, by the processing circuit, that a condition associated with the query having the group by clause is satisfied in a table, wherein the condition is selected from the group consisting of having a unique index on one or more columns of the table or having a function on the one or more columns that makes rows in the group by clause unique, the group by clause being part of the query on the table;

in response to the condition associated with the query having the group by clause being satisfied, skipping the group by clause associated with the one or more columns; and in response to the condition not being satisfied, executing the group by clause associated with the one or more columns.

16. The computer of claim 15, the computer is configured to check that that the function has a one input to one output when the function is applied to the one or more columns.

17. The computer of claim 16, wherein the function is a scalar function.

18. The computer of claim 17, wherein the function is a user defined function.

19. The computer of claim 15, wherein checking, by the computer, that the condition is satisfied for the table comprises parsing the query to find the group by clause.

20. The computer of claim 15, wherein skipping the group by clause associated with the one or more columns comprises executing the query without performing the group by clause.

\* \* \* \* \*